(12) United States Patent
Seki et al.

(10) Patent No.: US 6,412,368 B1
(45) Date of Patent: Jul. 2, 2002

(54) SADDLE SEAT TYPE MOTOR VEHICLE WITH LIMITED SLIP DIFFERENTIAL

(75) Inventors: Bunzo Seki; Akio Handa; Kazushiro Inoue; Hisahiro Komori; Akio Senda, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/654,256

(22) Filed: Sep. 1, 2000

(30) Foreign Application Priority Data

Sep. 2, 1999 (JP) ............................................ 11-249375

(51) Int. Cl.[7] ............................................. F16H 48/12
(52) U.S. Cl. ........................................ 74/650; 74/606 R
(58) Field of Search ................................. 180/248, 233; 74/650, 606 R (56) References Cited

U.S. PATENT DOCUMENTS

| 4,159,656 | A | * | 7/1979 | Tomich | 74/650 |
| 5,062,320 | A | * | 11/1991 | Parsons et al. | 74/650 |
| 5,203,232 | A | * | 4/1993 | Ito et al. | 74/650 |
| 5,461,941 | A | * | 10/1995 | Young | 74/650 |
| 5,542,316 | A | * | 8/1996 | Spooner et al. | 74/650 |
| 5,557,986 | A | * | 9/1996 | Young et al. | 74/650 |
| 5,560,268 | A | * | 10/1996 | Young | 74/650 |
| 5,609,073 | A | * | 3/1997 | Spooner et al. | 74/650 |
| 6,010,424 | A | * | 1/2000 | Irwin | 74/606 R |
| 6,135,229 | A | * | 10/2000 | Arimatsu | 180/248 |
| 6,196,942 | B1 | * | 3/2001 | Peterson et al. | 74/606 R |

FOREIGN PATENT DOCUMENTS

JP             62020722 A       1/1987

* cited by examiner

*Primary Examiner*—Dirk Wright
(74) *Attorney, Agent, or Firm*—Birch, Stewart, Kolasch & Birch, LLP (57) ABSTRACT

In a saddle seat type motor vehicle for use on uneven ground and including a front final assembly provided between left and right front wheels, the front final assembly provides the left and right front wheels with driving torques differentiated at a predetermined ratio when the wheels rotates at different speeds. When the motor vehicle turns, large driving torque is supplied to inner wheels rotating at low speeds compared with outer wheels rotating at high speeds. This enables the motor vehicle to turn effectively and to reduce steering effort.

16 Claims, 12 Drawing Sheets

← LOW SPEED ROTATION

← HIGH SPEED ROTATION

SADDLE SEAT TYPE MOTOR VEHICLE WITH LIMITED SLIP DIFFERENTIAL

BACKGROUND OF THE INVENTION

1. Field of the Invention

The present invention relates to a saddle seat type motor vehicle including a limited slip differential which is preferable for reducing steering effort and the number of components.

2. Description of Background Art

When a motor vehicle turns the turning radii of right and left driving wheels are different in the case of a two-wheel drive vehicle and the wheels rotate at different speeds. Therefore, a limited slip differential is required in order to absorb a difference between the revolution speeds of the driving wheels, i.e. in order to let the wheels rotate at speeds in accordance with their turning radii and distribute appropriate driving torques to the wheels.

This limited slip differential absorbs the difference of revolution speeds of the left and right driving wheels. However, if the left or right driving wheel slips on a road having a small frictional resistance, the other driving wheel has a small driving force, which means a reduced total driving force of the motor vehicle. Especially in the case of a four-wheel drive vehicle or a special vehicle running off-road or the like, a limited slip differential is required between the right and left driving wheels in order to control the difference of revolution speeds of these wheels and secure driving force.

Such a limited slip differential is described in Japanese Patent Publication No. Hei 5-63333, entitled "Differential Case for Limited Slip Differential". Referring to FIG. 1 of this publication, the limited slip differential comprises: a drive pinion 2 extending into an axle housing 1; a ring gear 3 engaged with the drive pinion 2; and a differential case 10 coupled to the ring gear 3. The ring gear 3 and differential case 10 are rotatably housed in the axle housing 1. A pinion shaft 31 is attached across the differential case 10 so as to pass therethrough, so that the pinion shaft 31 rotatably supports differential pinions 32 and 33. Both of the differential pinions 32 and 33 engage with side gears 35 and 37, to which drive shafts 8 and 9 are attached. Further, frictional torque generating mechanisms are provided between the inner surface of the differential case 10 and outer surfaces of the side gears 35 and 37.

A saddle seat type motor vehicle such as a buggy used on uneven ground and provided with a limited slip differential is required to have a compact and light body in order to turn in small radii to have improved handling.

Such a limited slip differential installed between the right and left front driving wheels has substantially the same structures for applying driving torque to the drive shafts 8 and 9. It is difficult for the limited slip differential to improve handling, i.e. it does not contribute to a reduction in the steering effort, so that further measures have to be provided in order to reduce the steering effort.

Recently, tires have been designed to have large diameters and widths in order to improve running performance of vehicles used off-road, which means an increase in the steering effort. Therefore, there have been great demands for reducing steering effort.

Further, the foregoing limited slip differential comprises many components which should be assembled in a number of processes. In order to reduce the manufacturing cost of the vehicle, it is necessary to reduce the number of components.

SUMMARY AND OBJECTS OF THE INVENTION

Therefore, the present invention is intended to provide a saddle seat type motor vehicle including a limited slip differential in order to reduce the steering effort and the number of components.

In order to accomplish the foregoing object, the present invention provides a saddle seat type motor vehicle for use off-road or the like and provided with a limited slip differential, which is positioned between right and left front wheels, and distributes to the right and left front wheels driving torques differentiated in accordance with a predetermined ratio when the front wheels rotate at different speeds.

The limited slip differential provides the front wheels with driving torques which are differentiated in accordance with a difference of revolution speeds of these wheels.

The limited slip differential supplies large driving torque to an inner wheel rotating at a low speed compared with an outer wheel rotating at a high speed, which is effective in improving the turning behavior and reducing steering effort.

According to the present invention, the limited slip differential includes a plurality of input side blocks moving around the axis in response to the rotation of a ring gear, two output side cams sandwiching the input side blocks for the purpose of letting the input side blocks relatively slip therebetween, and being capable of independently rotating using frictional force with the input side blocks, and a case for housing the input side blocks and the output side cams.

A plurality of input side blocks are sandwiched between the two input side cams such that the side blocks are capable of slipping relatively therebetween. The input side blocks and output side cams are housed in the case. The input side blocks move round the axis in response to the rotation of the ring gear, so that the output side cams rotate independently due to frictional force generated by the movement of the input side blocks, and driving torque is transmitted to the output side cams from the input side blocks.

It is therefore possible to distribute to the output side cams driving torques which are differentiated at the predetermined ratio in accordance with directions of frictional force varying with relative slippage of the input side blocks and output side cams due to different revolution speeds of the two output side cams.

In addition, the present invention provides for a ring gear which is integral with a part of the case.

The ring gear integral with the case does not require any fastening bolts compared with a case and a ring gear which are separate. This is effective in reducing the number of components, facilitating an assembly process, and lowering manufacturing cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
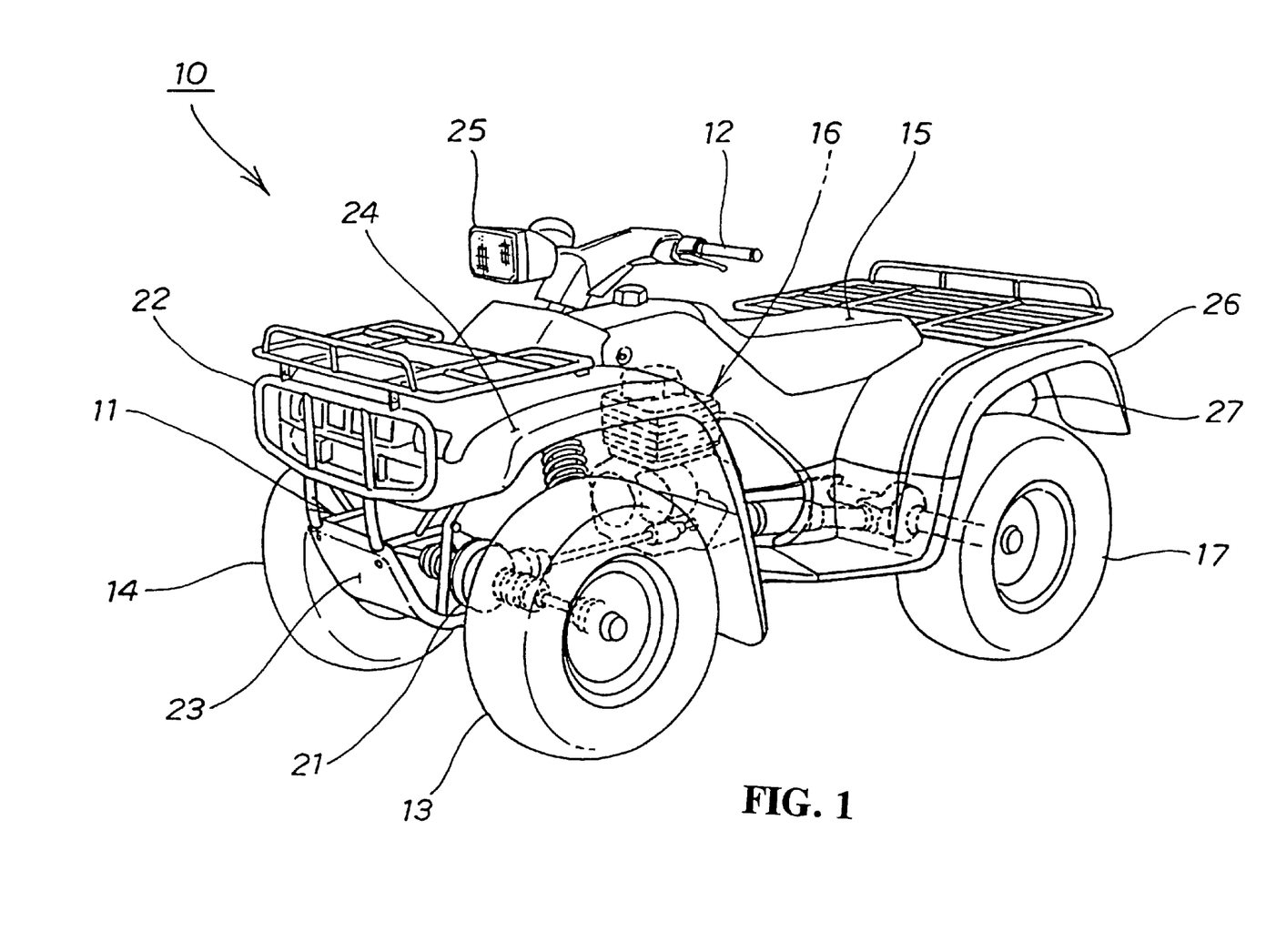
FIG. 1 is a perspective view of the saddle seat type motor vehicle including the limited slip differential according to the invention.

The invention will be described with reference to an embodiment shown in the accompanying drawings. FIG. 1 is a perspective view of a saddle seat type motor vehicle 10 (called the "motor vehicle 10" hereinafter) with a limited slip differential according to the invention. The motor vehicle 10 comprises: a handlebar 12 movably attached to a body frame 11; a front left wheel 13 and a front right wheel 14 which are connected to the handlebar 12 via a steering unit (not shown) so as to be steered and connected to the body frame 11 via arms (not shown) so as to be movable up and down, a seat 15 positioned on the upper part of the body frame 11; a power unit 16 positioned under the seat 15 and constituted by an engine and a transmission; and a right rear wheel 18 and a left rear wheel 17 which are driven together with the front wheels 13 and 14 by the power unit 16 via a transmission to be described later (the right rear wheel 18 is not shown in FIG. 1).

In FIG. 1, a front final assembly 21 constitutes a part of the transmission and includes a limited slip differential as an integral member and is positioned between the left and right front wheels 13 and 14. A front bumper 22, an under cover 23, a front mudguard 24, a headlight 25, a rear mudguard 26 and a muffler 27 are operatively connected to the body frame 11.

Figure 2:
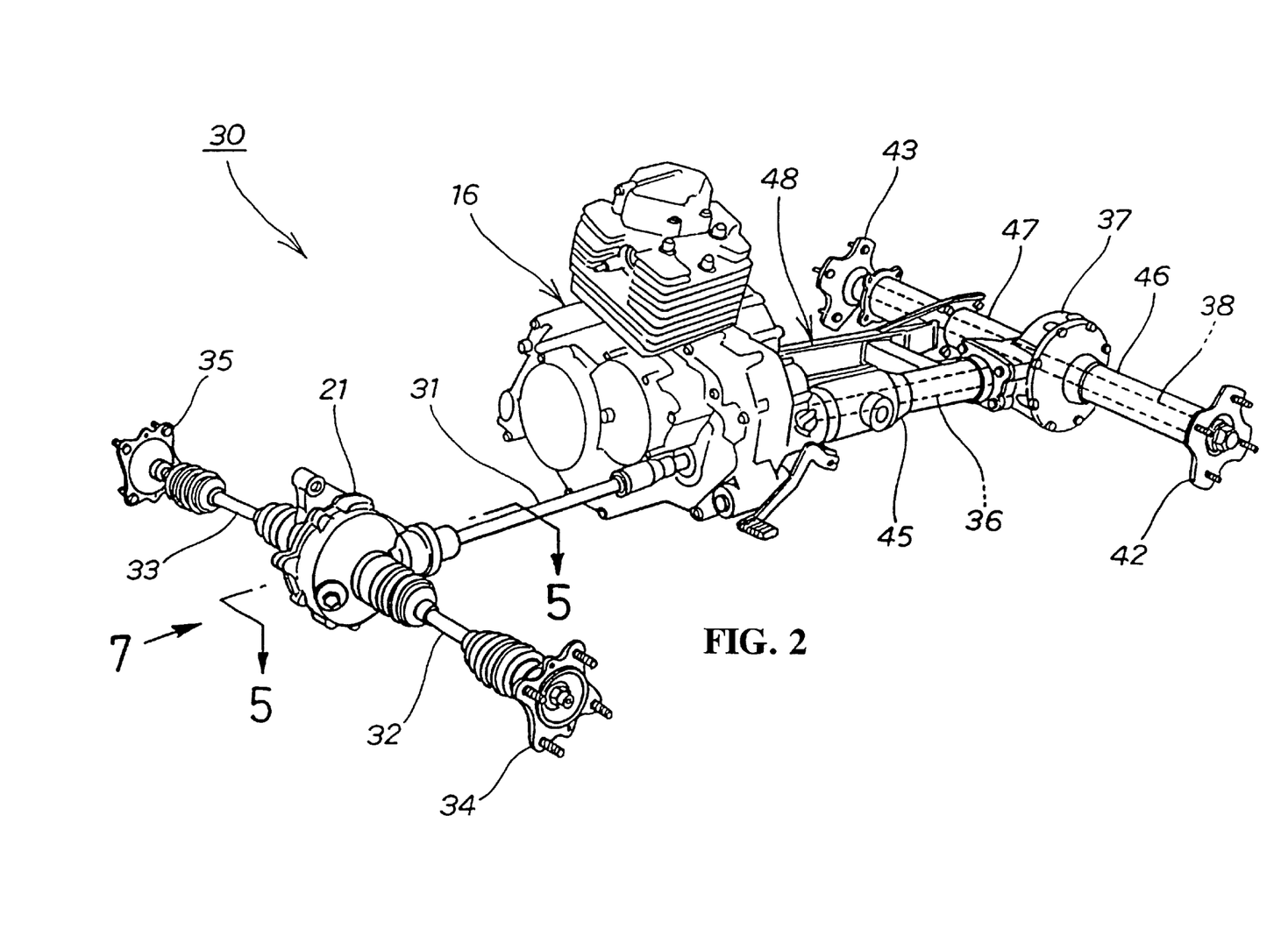
FIG. 2 is a perspective view showing the transmission.

FIG. 2 is a perspective view of the transmission 30 for the saddle seat type motor vehicle according to the invention. The transmission 30 comprises: a front propeller shaft 31 extending forward from an underside of the power unit 16; the front final assembly 21 coupled to one end of the front propeller shaft 31; front drive shafts 32 and 33 coupled to right and left sides of the front final assembly 21; hubs 34 and 35 coupled to ends of the front drive shafts 32 and 33; a rear propeller shaft 36 extending rearward from the underside of the power unit 16; a rear final assembly 37 coupled to the rear end of the rear propeller shaft 36; a rear drive shaft 38 extending to the left and right through the rear final assembly 37; and hubs 42 and 43 connected to the opposite ends of the rear drive shaft 38. In FIG. 2, tubes 45, 46 and 47 are provided for covering right and left surfaces of the rear propeller shaft 36 and the rear drive shaft 38. Further, a support 48 is provided for the tubes 45 and 47.

The hubs 34, 35, 42 and 43 are used to attach the right and left front wheels 14 and 13, and left and right rear wheels 17 and 18.

Figure 3:
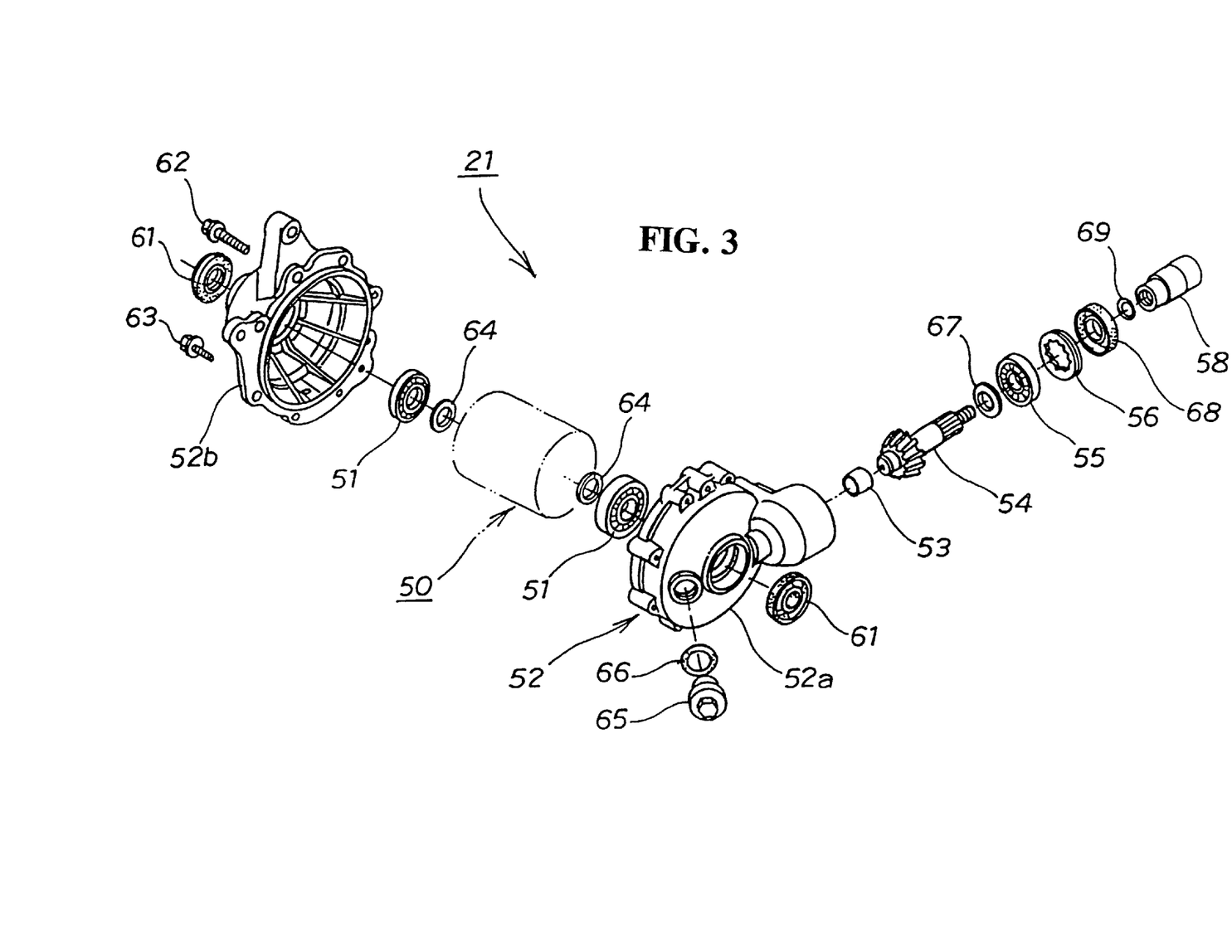
FIG. 3 is an exploded perspective view of the front final assembly.

An exploded perspective view of the front final assembly 21 is shown in FIG. 3. The front final assembly 21 includes: a differential case assembly 50 functioning as a limited slip differential; a housing 52 for rotatably housing the differential case assembly 50 via a pair of bearings 51; a drive pinion 54 fitted into the housing 52 from a rear side via a bearing 53; a bearing 55 for rotatably attaching the drive pinion 54 to the housing 52, a lock nut 56 for preventing the bearing 55 from coming out; and a joint 58 attached to an end of the drive pinion 54.

In FIG. 3, a housing body 52a is connected to a housing cover 52b. An oil seal 61 is provided in the housing body 52a. Bolts 62 and 63 are utilized for connecting the housing body 52a to the housing cover 52b. Spacers 64 are positioned adjacent to the bearings 51. A maintenance plug 65 and an O ring 66 are provided in the housing body 52a. A spacer 67 is mounted adjacent to the bearing 55. An oil seal 68 together with an O ring 69 are provided in the housing body 52a.

Figure 4:
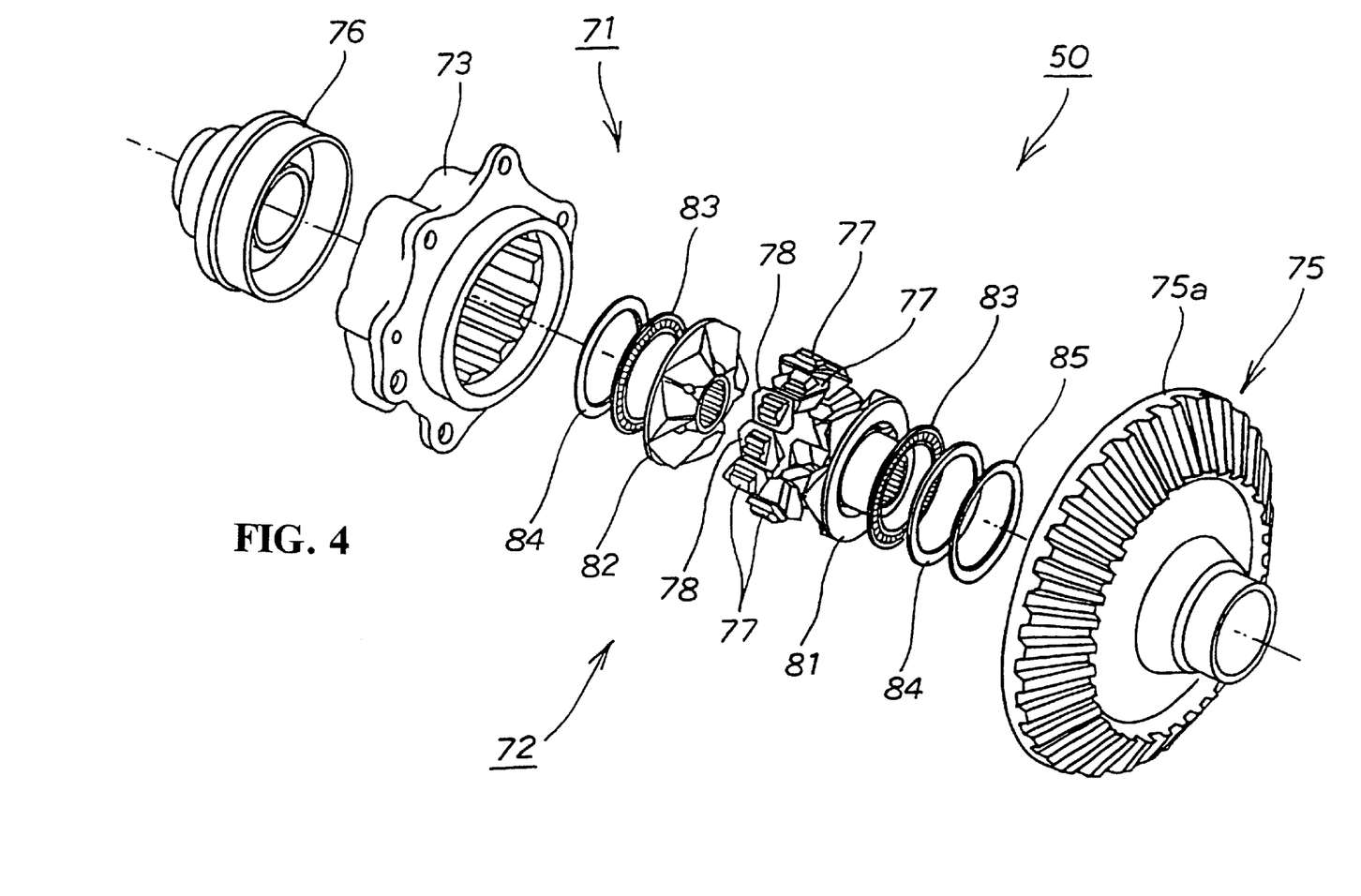
FIG. 4 is an exploded perspective view of the limited slip differential.

FIG. 4 is an exploded perspective view of the limited slip differential. The differential case assembly 50 includes a differential case 71, and components 72 housed in the differential case 71.

The differential case 71 includes a cylindrical case body 73, a left cap 75, and a right cap 76. The left cap 75 is attached to a left cap part 74, i.e. an open side of the case body 73 (to be described later), and includes a ring gear 75a as an integral part. The right cap 76 is fitted into the other open side of the case body 73. The left cap 75 is called the "ring gear cap 75" hereinafter.

The components 72 housed in the differential case 71 are: a plurality of input side blocks 77 . . . and 78 . . . ; left and right output side cams 81 and 82 which sandwich the input side blocks 77 and 78 so that the input side blocks 77 . . . and 78 . . . are relatively slidable therebetween, and are independently rotatable by frictional force with the blocks 77 and 78; a pair of thrust bearings 83 and a pair of thrust washers 84 which are adjacent to the left and right output side cams 81 and 82; and a coned disc spring 85. The thrust bearings 83 may be omitted.

Figure 5:
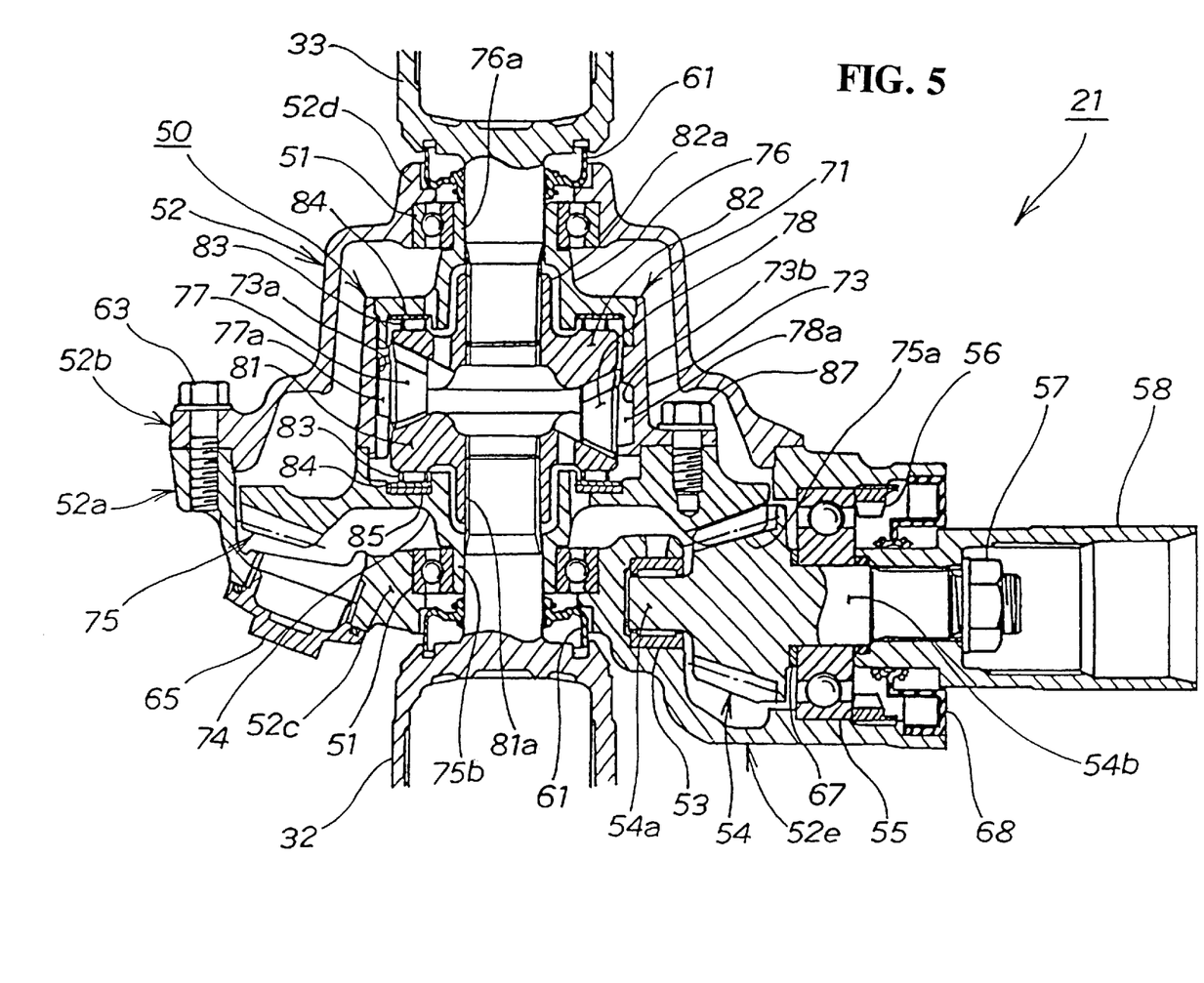
FIG. 5 is a sectional view of the transmission, taken along line 5—5 in FIG. 2.

FIG. 5 is a sectional view of the transmission 30, taken along line 5—5 in FIG. 2.

In the front final assembly 21, the components are arranged in the following manner. The ring gear cap 75 has the ring gear 75a formed at the left cap part 74 as an integral part. The left output side cam 81 is arranged in the ring gear cap 75 via the coned disc spring 85, thrust washer 84 and thrust bearing 83. The base body 73 is attached to the ring gear cap 75 using a bolt 87. The input side blocks 77 and 78 are arranged in a circle in the case body 73 so as to be in contact with the left output side cam 81. The right cap 76 is placed adjacent to the right output side cam 82 via the thrust bearing 83 and thrust washer 84. The right cap 76 is attached to the case body 73.

Further, in the front final assembly 21, the housing 52 is assembled as follows. A cylindrical part 75b of the ring gear cap 75 is attached to a journal 52c of the housing body 52a via the bearing 51. A cylindrical part 76a of the right cap 76 is attached to a journal 52d of the housing cover 52b via the bearing 51b. The housing cover 52b is attached to the housing body 52a using the bolts 62 (shown in FIG. 3) and bolts 63 (only one bolt 63 is shown in FIG. 3). Finally, the differential case body 50 is rotatably attached in the housing 52.

Still further, the front final assembly 21 includes the following components. An end 54a of the drive pinion 54 is fitted into a rear cylindrical part 52e of the housing body 52a via the bearing 53. An intermediate portion 54a of the drive pinion 54 is fitted into the rear cylindrical part 52e of the drive pinion 54 so that the drive pinion 54 engages with the ring gear 75a. A lock nut 56 is screwed to an inner surface of the rear cylindrical portion 52e in order to prevent the bearing 55 from coming out. A joint 58 is coupled to the rear end of the drive pinion 54, and an oil seal 68 is arranged between the inner surface of the rear cylindrical portion 52e and the joint 58.

The input side blocks 77 and 78 are provided with projections 77a and 78a, which are fitted into axial grooves 73a . . . and 73b . . . formed on the inner surface of the case body 73 in order to rotate together with the case body 73.

The left and right output side cams 81 and 82 provide the left and right front wheels 13 and 14 (shown in FIG. 1) with driving force when front drive shafts 32 and 33 are spline fitted to the cylindrical portions 81a and 82a.

With the front propeller shaft 31 spline fitted to the joint 58 (see FIG. 2), the drive pinion 54 transmits driving force from the power unit 16 (see FIG. 1) to the differential case assembly 50.

As described so far, the differential case assembly 50 features that the ring gear 75a is integral with the left cap part 74 which is a part of the differential case 71.

In the foregoing structure, the ring gear 75a is formed as the integral part of the left cap 74 of the differential case 71, so that no fastening bolt is necessary, which is effective in reducing the number components, facilitating a forming process, and reducing manufacturing cost compared to a case where a case and a ring gear are separate members.

The input side blocks of the limited slip differential according to the invention will be described with reference to FIGS. 6(a) to 6(c).

Figure 6A:
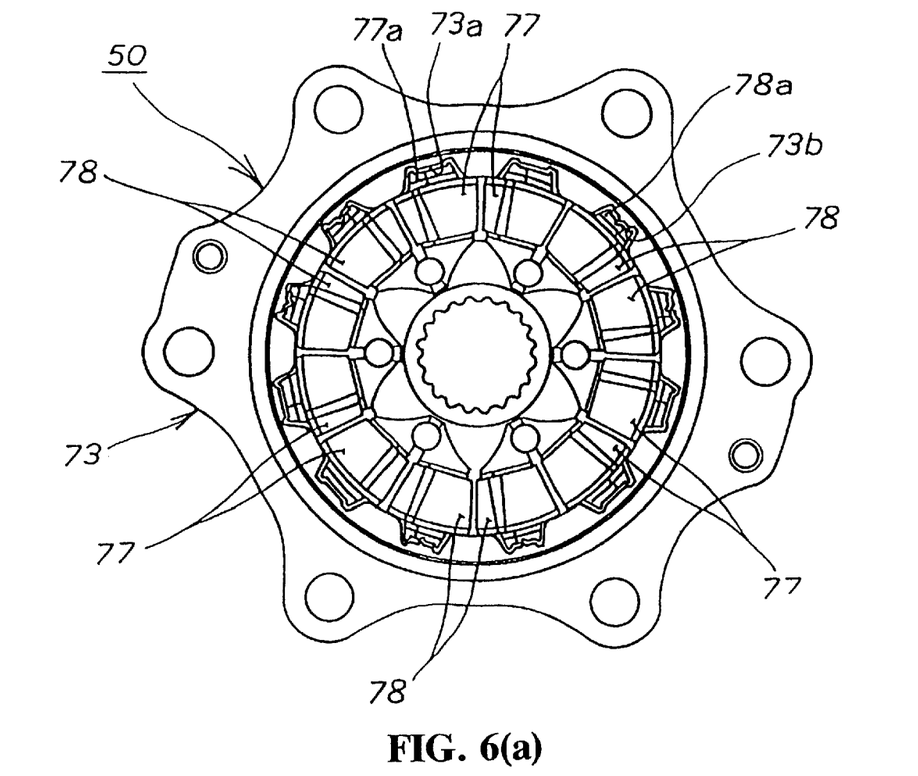
FIGS. 6(a), 6(b) and 6(c) show the structure of the input side blocks of the limited slip differential.

FIG. 6(a) shows the differential case assembly 50 from which the ring-gear cap 75 (shown in FIG. 5) and the left output side cam 81 (shown in FIG. 5) are detached.

Every two input side blocks 77 and 78 are arranged in a circle so that the projections 77a and 78a are fitted in the axial grooves 73a . . . and 73b . . . on the inner surface of the case body 73.

Figure 6B:
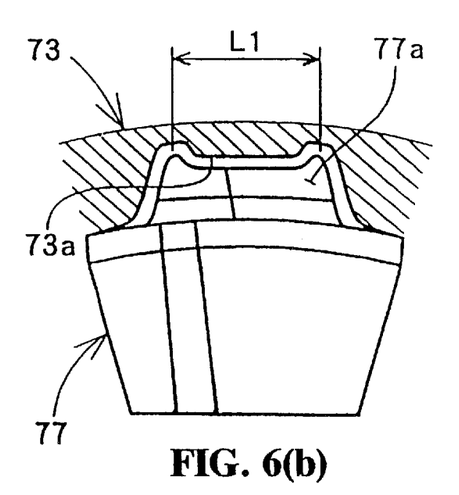

FIG. 6(b) is an enlarged view of the essential parts, showing the case body 71 and the input side 77 in engagement with the case body 73.

The axial grooves 73a are substantially in the shape of a truncated cone, and the projections 77a are shaped substantially identical to the axial grooves 73. It is assumed here that each projection 77a has a top width L1.

Figure 6C:
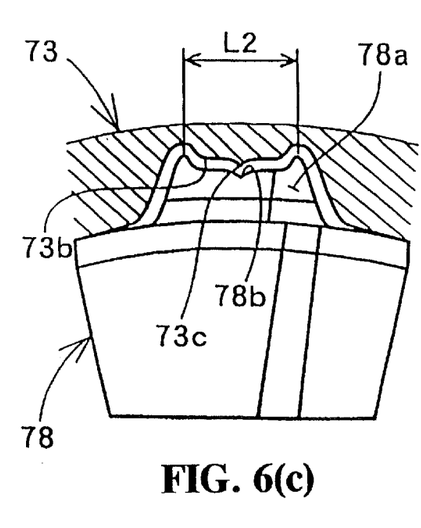

The essential part of the case body 73 and the input side block 78 which is engaged with the case body 73 are shown in FIG. 6(c) on an enlarged scale.

The axial grooves 73b are substantially in the shape of a truncated cone, and the projections 78a are shaped substantially similar to the axial grooves 73. It is assumed here that each projection 78a has a top width L2, which differs from the top width L1 (i.e. L1≠L2).

In FIGS. 6(b) and 6(c), although the top width L1 is larger than L2 (i.e. L1>L2), the former may be smaller than the latter (i.e. L1<L2).

Further, the axial grooves 73b have projections 73c on bottoms thereof, while the projections 78a have recesses 78b corresponding to the projections 73c.

Figure 7A:
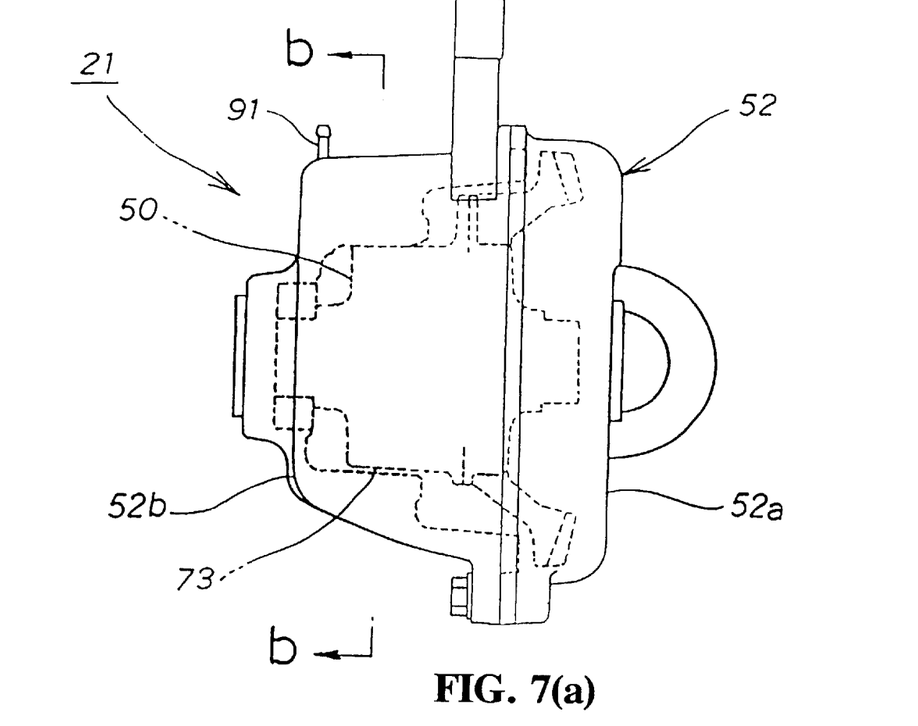
FIGS. 7(a) and 7(b) show the breather structure of the front final assembly provided with the limited slip differential.
Figure 7B:
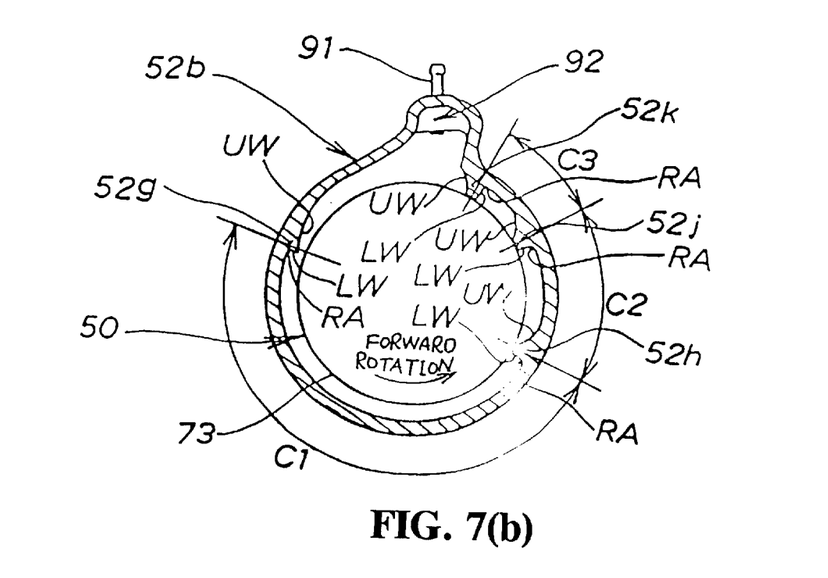

The front final assembly 21 including the limited slip differential further has a breather as shown in FIGS. 7(a) and 7(b). Specifically, FIG. 7(a) shows the front final assembly 21 viewed from the direction shown by an arrow in FIG. 2, and FIG. 7(b) is a sectional view taken along line b—b in FIG. 2.

Referring to FIG. 7(a), the front final assembly 21 is provided with a breather joint 91, on the upper part of the housing cover 52b, via which the housing 52 communicates with the outside.

As shown in FIG. 7(b), the housing cover 52b has its top expanded in order to form a breather chamber 92, on the upper wall of which the breather joint 91 is positioned.

The housing cover 52b is provided with a plurality of oil reserving ribs 52g, 52g, 52j and 52k on the inner surface thereof The oil reserving ribs 52g, 52g, 52j and 52k are positioned below the breather chamber 92, extend substantially in parallel to the rotation axis of the differential case assembly 50, and are unequally spaced. Further, the oil reserving ribs 52g, 52g, 52j and 52k are designed so as to be adjacent to the case body 73 of the differential case assembly 50.

It is assumed here that the differential case assembly 50 rotates forward as shown by arrows when the motor vehicle advances.

Each of the oil reserving ribs 52g, 52g, 52j and 52k has a lower wall LW which is far from the breather chamber 92, and extends substantially upright from the inner surface of the housing cover 52b, a curved corner RA having a small radius r1, and a curved wall UW which is near the breather chamber 92. A radius r2 of the curved wall UW is larger than the radius r1 (i.e. r2>r1).

On the inner surface of the housing cover 52b, the oil reserving rib 52g is positioned opposite to the oil reserving ribs 52g, 52j and 52k with the differential case assembly 50 interposed therebetween.

The oil reserving ribs 52g, 52g, 52j and 52k are spaced by angles C1, C2 and C3, specifically C1>C2>C3.

The sizes of C1, C2 and C3 also represent amounts of oil reserved between the oil reserving ribs 52g, 52g, 52j and 52k.

In other words, an oil reserving capacity between the oil reserving ribs 52g and 52g is larger than an oil reserving capacity between the oil reserving ribs 52g and 52j, and the oil reserving capacity between the oil reserving ribs 52g and 52j is larger than an oil reserving capacity between the oil reserving ribs 52j and 52k.

The presence of the oil reserving ribs 52g, 52g, 52g and 52j enables the housing 52 to dispense with a component for reserving oil, which is effective in reducing the number of components and manufacturing cost. Further, since the oil reserving ribs 52g, 52g, 52g and 52j are integral with the housing 52, they neither resonate nor are broken, even if the housing 52 vibrates.

FIGS. 8(a) to 8(d) are schematic development views of the input side blocks and output side cams in which these members are developed in a circumferential direction. FIGS. 8(a) to 8(d) show how the left output side cam 81 relatively moves to the left (in the plane shown by these drawing figures) with respect to the right output side cam 82 as time elapses.

Figure 8A:
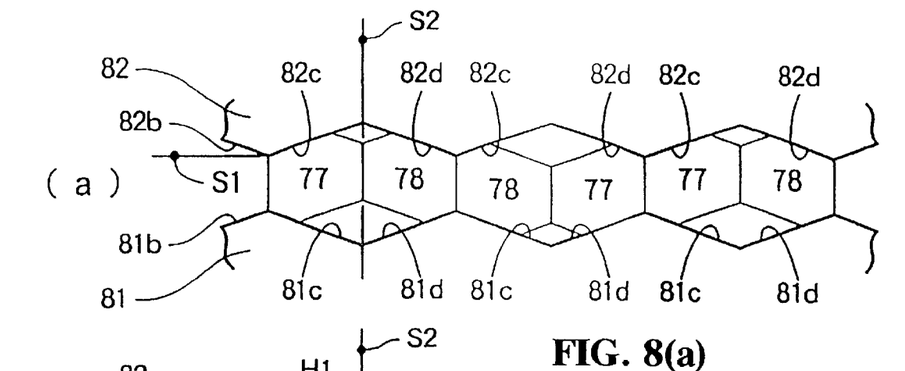
FIGS. 8(a) to 8(d) are schematic development views of the input side blocks and output side cams which are developed round the axis.

Referring to FIG. 8(a), the input side blocks 77 are hexagonal when developed, and have an inverse lateral relationship to the input side blocks 78.

The left output side cam 81 has an undulating cam surface 81b which joins alternately with the first and second left slopes 81c and 81d.

The right output side cam 82 has an undulating cam surface 82b, which joins alternately with first and second right slopes 82c and 82d.

In FIGS. 8(a) to 8(d), S1 and S2 denote base lines determined assuming that a part of the right output side cams 82 is considered as the reference.

Figure 8B:
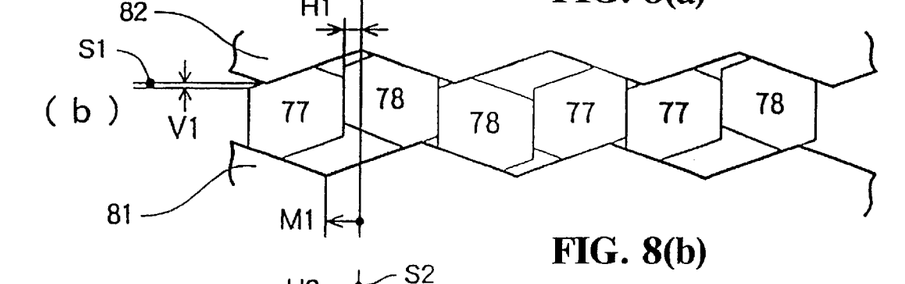

Referring to FIG. 8(b), when receiving force in the circumferential direction (to the left in FIG. 8(b)), the input side blocks 77 move from the right output side cam 82 by a distance V1 toward the left output side cam 81, and the right output side cam 82 relatively moves by a distance H1 in a direction opposite (to the right in FIG. 8(b)) to the input side blocks 77. Further, the left output cam 81 relatively moves by a distance MI to the left with respect to the right output side cam 82.

Figure 8C:
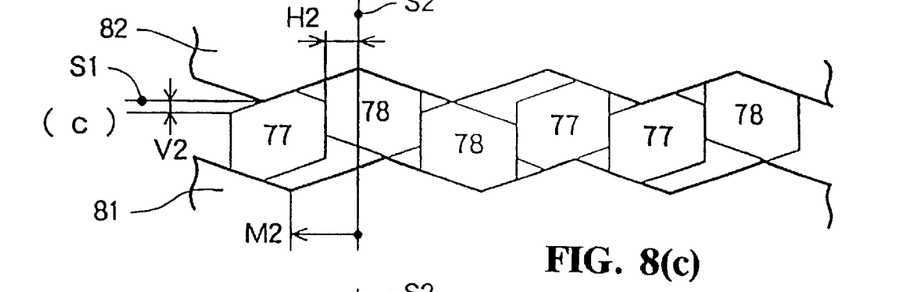

In the state shown in FIG. 8(c), when receiving force (to the left in FIG. 8(c)), the input side blocks 77 move from the right output side cam 82 by a distance V2 toward the left output side cam 81, and the right output side cam 82 relatively moves by a distance H2 in a direction opposite (to the right in FIG. 8(b)) to the input side blocks 77. Further, the left output cam 81 relatively moves by a distance M2 to the left with respect to the right output side cam 82 with respect to the right output side cam 82.

Figure 8D:
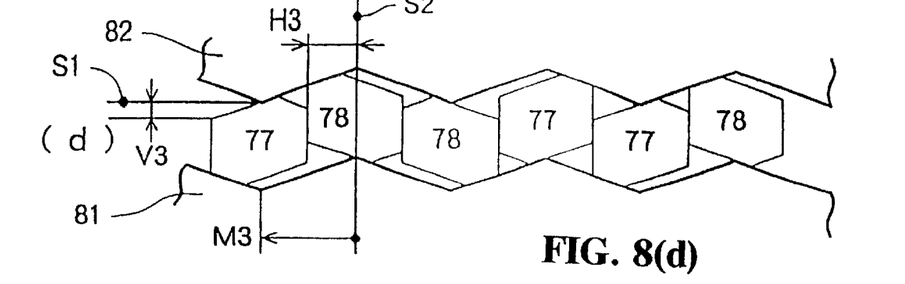

Referring to FIG. 8(d), when receiving force (to the left in FIG. 8(d)), the input side blocks 77 move from the right output side cam 82 by a distance V3 toward the left output side cam 81, and the right output side cam 82 relatively moves by a distance H3 in a direction opposite (to the right in FIG. 8(b)) to the input side blocks 77. Further, the left output cam 81 relatively moves by a distance M3 to the left with respect to the right output side cam 82.

As described above with respect to the input side blocks 77, the input side blocks 77 . . . and 78 . . . relatively move, i.e. relatively rotate, by generating frictional force between the left and right output side cams 81 and 82 when these cams 81 and 82 rotate at different speeds, i.e. there is a difference between revolution speeds of the cams 81 and 82.

Conversely, when the left and right output side cams 81 and 82 rotate at an equal speed, both of the output side blocks 77 and 78 rotate in unison.

The operation of the limited slip differential will be described with reference to FIGS. 9(a) and 9(b).

Figure 9A:
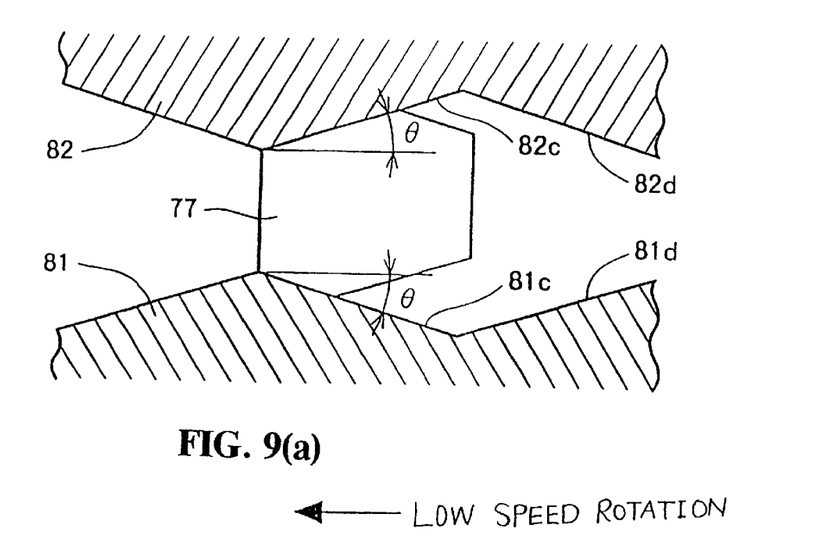
FIGS. 9(a) and 9(b) shows the operation of the limited slip differential.

FIG. 9(a) is an enlarged view of the input side block 77 (the leftmost one) and the left and right output side cams 81 and 82 shown in FIG. 8(a). The left first slope 81c of the left output side cam 81 and the right first slope 82c of the right output side cam 82 have an angle of inclination of θ.

Figure 9B:
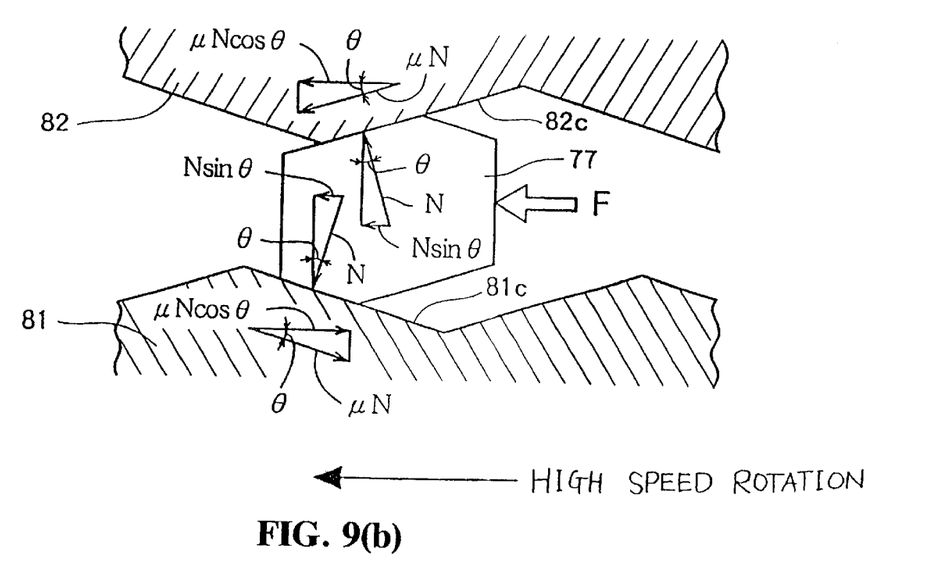

Referring to FIG. 9(b), the following describes a case in which when leftward force F is applied to the input side block 77, the left output side cam 81 rotates at a high speed, the right output side cam 82 rotates at a low speed, and there is a difference of rotation speeds of the cams 81 and 82.

In this state, the input side block 77 presses the left first slope 81c of the left output side cam 81 and the right first slope 82c of the right output side cam 82 with force N which is vertical to the slopes 81c and 82c. A leftward component of force N is Nsin θ.

When the left output side cam 81 relatively moves left with respect to the input side block 77, frictional force $\mu$N is produced by the input side block 77 and the slope 81c. A rightward component of the frictional force $\mu$N is $\mu$Ncos θ, which is -,Ncos θ as the leftward component.

Therefore, leftward force applied to the left output side cam 81 from the input side block 77 is Nsin θ-$\mu$Ncos θ.

On the other hand, when the right output side cam 82 relatively moves rightward with respect to the input side block 77, frictional force $\mu$N is produced by the input side block 77 and the right first slope 82c. A leftward component of the frictional force $\mu$N is $\mu$Ncos θ.

Therefore, leftward force applied to the right output side cam 82 from the input side block 77 is Nsin θ+$\mu$Ncos θ.

From the foregoing, when there is the difference between the rotation speeds of the left and right output side cams 81 and 82, a large force is produced at the right output side cam 82 rotating at a low speed compared with the force produced at the left output side cam 81 rotating at a high speed.

The leftward force N acting on the left output side cam 81 and the leftward force N acting on the right output side cam 82 are in the ratio of (Nsin θ-$\mu$Ncos θ): (Nsin θ+$\mu$Ncos θ)=(sin θ-$\mu$cos θ):(sin θ+$\mu$cos θ).

The foregoing ratio finally serves as a ratio of driving torques distributed to the left and right front wheels.

As described with reference to FIG. 4, the present invention features that the differential case assembly 50 is constituted by: the plurality of the input side blocks 77 and 78 which move round the axis in response to the rotation of the ring gear 75a, the two left and right output side cams 81 and 82 which slidably sandwich the input side blocks 77 and 78 therebetween and independently rotate by the frictional force of the input side blocks 77 and 78; and the differential case 71 which houses the input side blocks 77 and 78, and the left and right output side cams 81 and 82.

Using the foregoing arrangement, it is possible to provide the output side cams 81 and 82 with the driving torques which are differentiated at the predetermined ratio in accordance with a direction of frictional force varying with the relative sliding of the input side blocks 77 and 78 and the output side cams 81 and 82 that is caused due to different rotational speed of the two output side cams 81 and 82. Therefore, even when some driving wheels have a reduced driving force due to variations of the frictional coefficient of a road surface, driving force of the other wheels can be protected against reduction, which makes it possible to maintain the overall driving force and improve running performance.

The driving force is distributed as described below when the saddle seat type motor vehicle with the foregoing limited slip differential is advancing in a straight line.

Figure 10A:
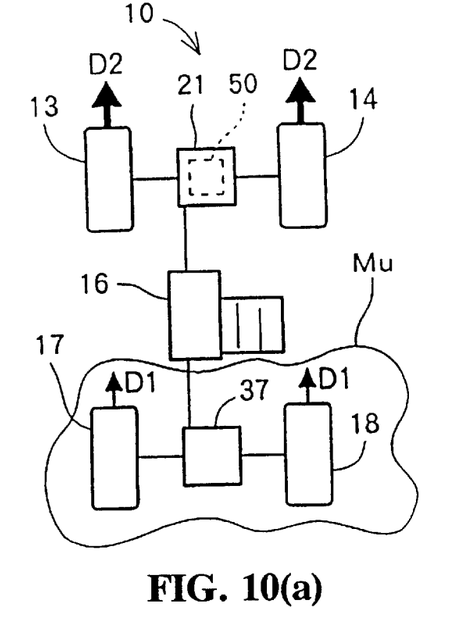
FIGS. 10(a) and 10(b) show distribution of driving force during the straight forward movement of the motor vehicle provided with the limited slip differential according to the invention.
Figure 10B:
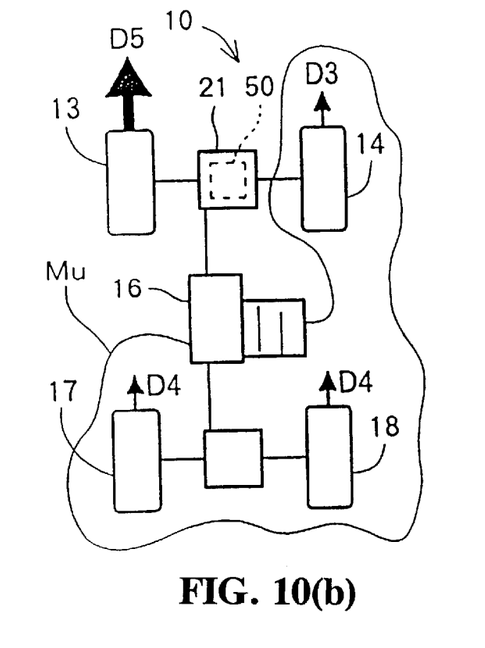

FIGS. 10(a) and 10(b) show the distribution of the driving force when the saddle seat type motor vehicle with the foregoing limited slip differential is advancing in a straight line. In FIGS. 10(a) and 10(b), the lengths of the black arrows correspond to amounts of the driving force.

Referring to FIG. 10(a), when the rear wheels 17 and 18 run on a muddy road Mu having a small frictional coefficient, they tend to slip, and driving forces D1, D1 are reduced as shown by small black arrows. If the front wheels 13, 14 are running on a rough road having a large frictional resistance, large driving forces D2, D2 are generated at the front wheels 13, 14 as shown by large black arrows.

When the right front wheel 14 and rear wheels 17 and 18 run on a muddy road Mu having a small frictional coefficient, driving force D3 of the right front wheel 14 and driving forces D4, D4 of the rear wheels 17 and 18 are reduced as shown by black arrows in FIG. 8(b). However, if the left front wheel 13 runs on a rough road having a large frictional coefficient, there is a difference in rotational speed of the left front wheel 13 and the slipping right front wheel 14. As a result, a large driving force D5 is generated at the left front wheel 13 as shown by black arrow, in response to the operation of the front final assembly 21.

Steering effort of the motor vehicle with the limited slip differential will be described hereinafter.

Figure 11A:
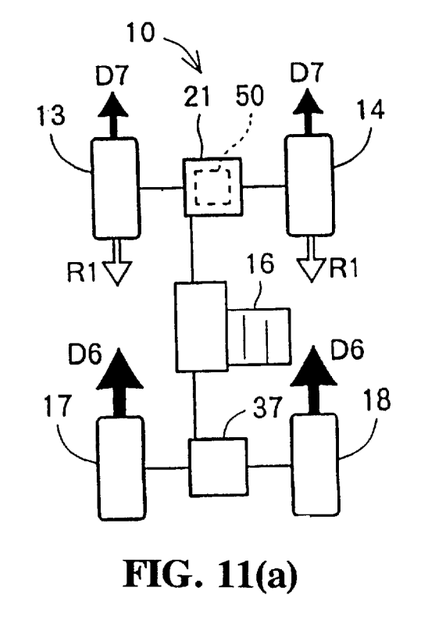
FIGS. 11(a) and 11(b) show steering effort of the motor vehicle according to the invention.
Figure 11B:
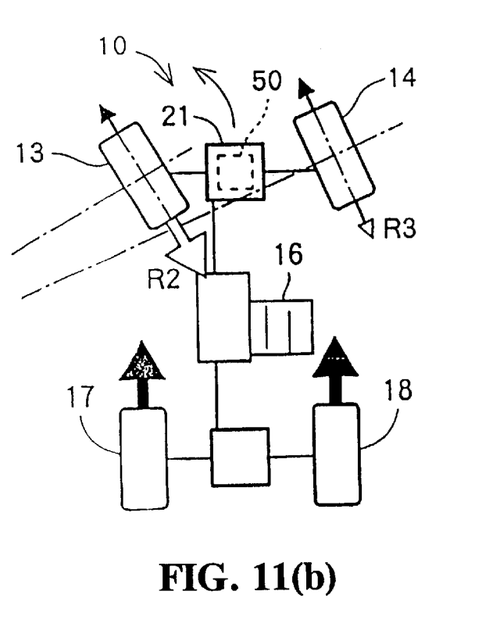

FIGS. 11(a) and 11(b) show the steering effort of the motor vehicle according to the present invention. In FIGS. 11(a) and 11(b), the lengths of the black arrows correspond to amounts of driving force while the lengths of the white arrows correspond to the amount of resistance during driving.

Referring to FIG. 11(a), the rear wheels 17 and 18 rotate at speeds slightly higher than a speed of the front wheels 13 and 14 in order to reduce the steering effort.

As a result, when the motor vehicle is driving in a straight line, driving forces D6, D6 of the rear wheels 17 and 18 are increased as shown by the black arrows while driving forces D7, D7 of the front wheels 13 and 14 are reduced as shown by the black arrows. Further, resistances R1, R1 are generated at the front wheels 13 and 14 as shown by the white arrows.

When the front wheels 13 and 14 are steered as shown in FIG. 11(b), the rear wheels 17 and 18 are made to rotate slightly faster than the front wheels 13 and 14, and a resistance R2 generated at the inner front wheel 13 is larger than a resistance R3 at the outer front wheel 14 in response to the operation of the front final assembly 21, which is effective in reducing the steering effort.

Figure 12:
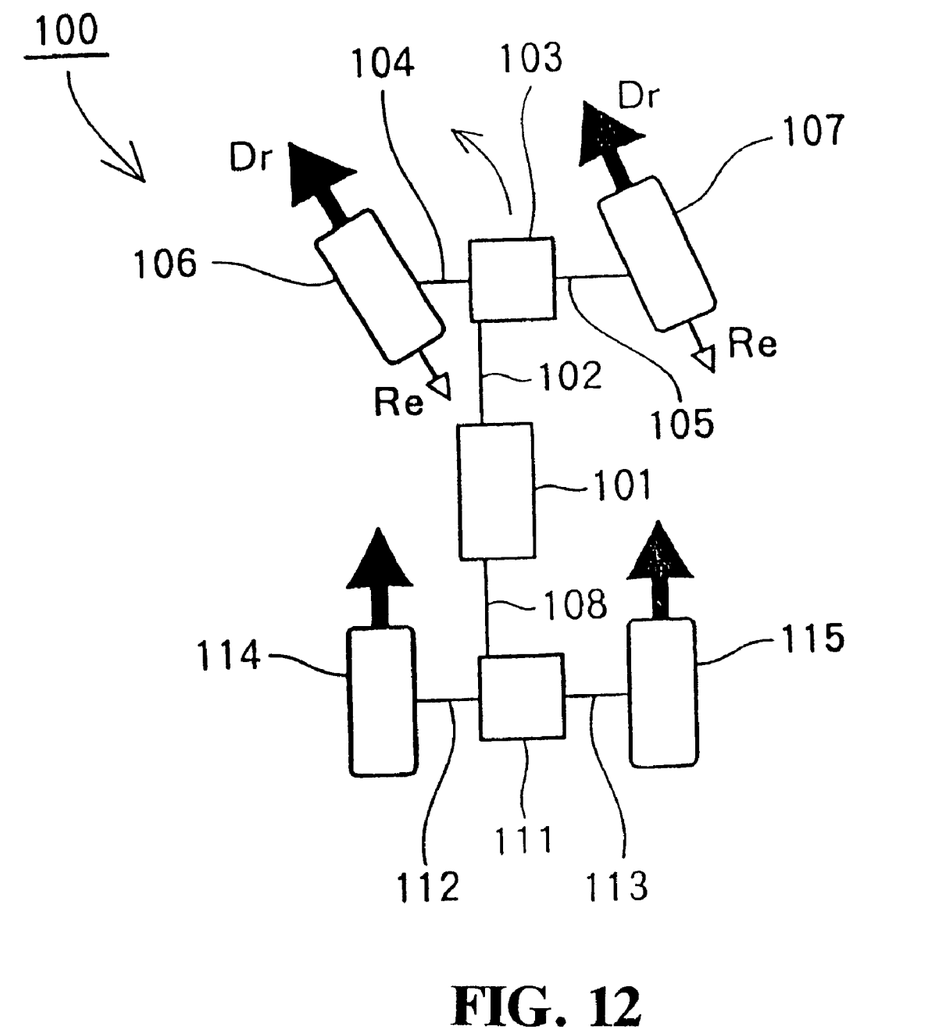
FIG. 12 shows steering effort of a motor vehicle including a limited slip differential of the related art.

FIG. 12 shows variations of steering effort of an example of a motor vehicle 100 including a limited slip differential which distributes equal driving forces to the steered left and right front wheels. In FIG. 12, the lengths of the black arrows correspond to an amount of the driving force while lengths of the white arrows correspond to the amounts of resistances during driving.

In the motor vehicle 100, the driving force of a power unit 101 is transmitted to a limited slip differential 103 via a front shaft 102. Further, the limited slip differential 103 provides the driving force to front wheels 106 and 107 via left and right front drive shafts 104 and 105.

In addition, the driving force of the power unit 101 is transmitted to a limited slip differential 111 via a rear shaft 108. Then, the driving force is transmitted to rear wheels 114 and 115 via rear drive shafts 114 and 115.

In the foregoing motor vehicle 100, all of the wheels 106, 107, 114 and 115 are rotating at the same speed, and the limited slip differential 103 distributes equal driving force to all of the wheels. Therefore, driving forces Dr, Dr of the left and right front wheels 106 and 107 are equal. Even if the rear wheels 114 and 115 are rotated slightly faster than the front wheels 106 and 107, resistances Re, Re acting on the front wheels 106 and 107 are equal. This does not contribute to a reduction of the steering effort.

As described with reference to FIG. 11(b), the motor vehicle 10 for rough road driving includes the differential case assembly 50 which is installed between the left and right front wheels 13 and 14, and distributes driving torques that are differentiated at the predetermined ratio in accordance with a difference of rotating speeds of the front wheels 13 and 15.

The foregoing arrangement enables large driving torques to be distributed to the inner wheels compared with those to the outer wheels, which is effective in producing larger resistances at the inner wheels than those at the outer wheels, and improving the operating property of the motor vehicle.

A breather structure of the foregoing front final assembly will be described hereinafter.

Figure 13A:
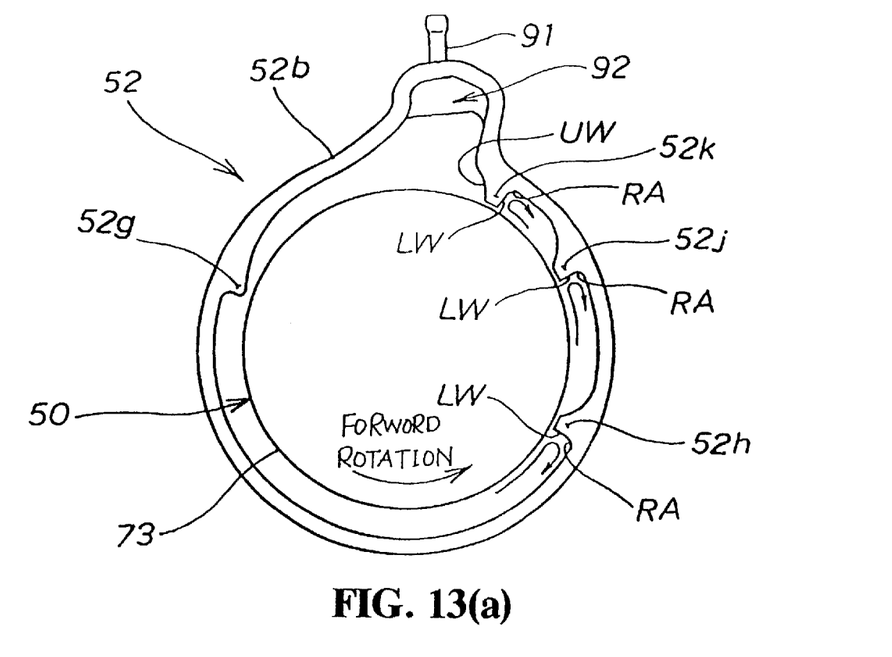
FIGS. 13(a) and 13(b) show the operation of the breather structure of the front final assembly provided with the limited slip differential.
Figure 13B:
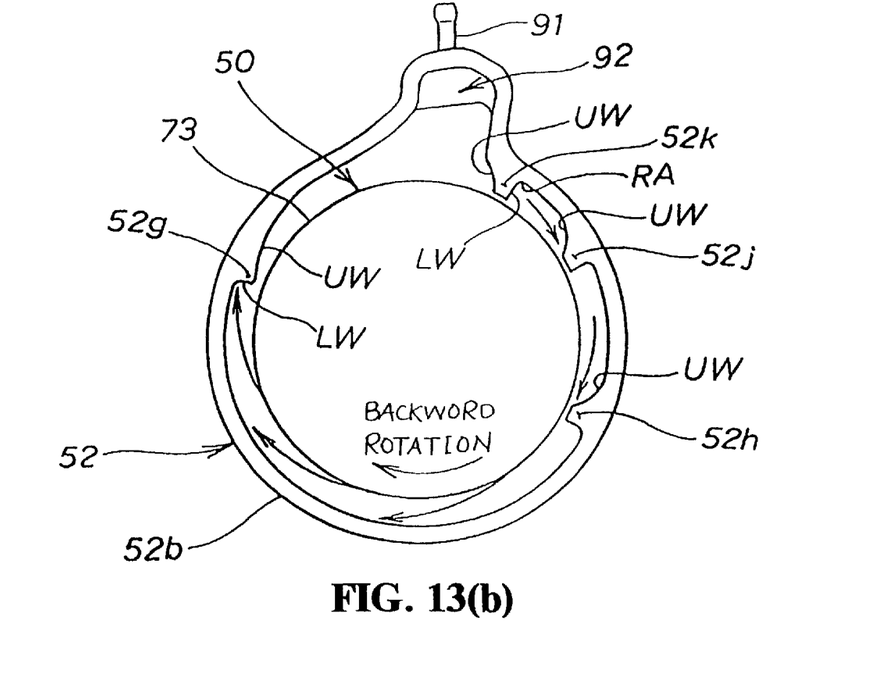

FIGS. 13(a) and 13(b) show the operation of the breather structure used in the present invention.

Referring to FIG. 13(a), when the differential case assembly 50 rotates forward as shown by an arrow, oil in the housing 52 tends to flows counterclockwise in a space defined by the outer surface of the differential case assembly 50 and the inner surface of the housing cover 52b, but is stopped by the oil reserving ribs 52g, 52j and 52k.

When the differential case assembly 50 rotates at a low speed, most of the oil is stopped by the oil stopping rib 52g positioned at an upstream section of an oil flow path, and is reserved at the lower part of the housing cover 52b, i.e. between the two oil reserving ribs 52g and 52g.

When the differential case assembly 50 rotates at a higher speed, more oil passes through the space between the differential case assembly 50 and the oil stopping rib 52g, but is stopped by the oil stopping rib 52j and is reserved between the oil reserving ribs 52g and 52j.

Further, when the differential case assembly 50 rotates at a much higher speed, more oil flows through the space between the differential case assembly 50 and the oil reserving 52g, but is stopped by the oil stopping rib 52k and is reserved between the oil reserving ribs 52j and 52k. As a result, oil cannot flow into the breather chamber 92.

The oil reserving ribs 52g, 52g, 52j and 52g are effective in preventing oil from flowing into the breather chamber 92 in a wide rotation speed range of the differential case assembly 50.

Since the oil reserving ribs 52g, 52g, 52j and 52k are irregularly spaced, a lot of oil can be stopped at an upstream part of the oil path, and an amount of oil stopped at a downstream part can be reduced compared with a case where oil reserving ribs are equally spaced. In particular, it is possible to reduce an mount of oil overflowing between the oil reserving ribs 52j and 52k, which is effective in preventing oil from reaching the breather chamber 92.

The oil reserving ribs 52g, 52j and 52k have walls LW which are far from the breather chamber 92 and are very steep, and radii RA . . . of these oil reserving ribs are made small. This arrangement is very effective in preventing oil from reaching the breather chamber 92.

As the differential case assembly 50 rotates in a reverse direction as shown by an arrow in FIG. 13(b), oil in the housing 52 flows clockwise between the outer surface of the differential case assembly 50 and the inner surface of the housing cover 52b.

In this state, walls UW . . . of the oil reserving ribs 52g, 52j and 52k which are nearer the breather chamber 92 are downwardly curved with a large radius, so that oil coming near these oil reserving ribs can be smoothly guided into the space between the differential case assembly 50 and the oil reserving ribs, and is made to flow to an underside of the housing cover 52b.

Oil reaching the underside of the housing cover 52b flows clockwise as shown by the arrows, and is guided toward the housing cover 52b from the differential case assembly 50 by the centrifugal force. Therefore, oil is effectively stopped by the wall LW of the oil reserving rib 52g.

As described with reference to FIGS. 13(a) and 13(b), during the forward rotation of the differential case assembly 50, a volume of oil can be gradually reduced as the differential case assembly 50 increases its rotation speed. As a result, it is possible to reliably prevent oil reaching the breather chamber 92.

Therefore, it is possible to prevent leakage of oil to an exterior of the front final assembly.

Further, during the forward rotation of the differential case assembly 50, oil flowing upward is stopped by the walls LW of the oil reserving ribs 52g, 52j and 52k, so that oil is stopped and reserved at the lower part of the housing 52.

Conversely, during the backward rotation of the differential case assembly 50, reserved oil flows on the downward sloping walls UW of the oil reserving ribs 52g, 52j and 52k, and is stopped by the walls LW of the oil stopping rib 52g, so that oil is stopped.

Therefore, during both the forward and backward rotation of the differential case assembly 50, no oil reaches the breather chamber 92 or leaks outside the front final assembly 21 via the breather joint 91. This is effective in lengthening the life of the front final assembly 21.

The motor vehicle having the foregoing structure is effective in the following respects. According to the present invention, a saddle seat type motor vehicle for use on uneven ground and including a limited slip differential which is provided between right and left front wheels, and distributes, to the right and left front wheels, driving torques which are differentiated at a predetermined ratio when the right and left front wheels rotate at different speeds. When the motor vehicle turns, large driving force is applied to the inner wheels rotating at low speeds compared with the driving force applied to the outer wheels rotating at high speeds, which is effective in assuring reliable turning and reducing steering effort. Therefore, handling of the motor vehicle is extensively improved.

In addition, according to the present invention the limited slip differential includes a plurality of input side blocks moving round the axis in response to the rotation of a ring gear, two output side cams for sandwiching the input side blocks for the purpose of letting the input side blocks relatively slip therebetween, and being capable of independently rotating using frictional force with the input side blocks, and a case for housing the input side blocks and the output side cams. Even when part of the wheels suffers from reduced driving force due to a variation of a frictional coefficient of a road surface, driving force applied to the remaining wheels is not lowered. Therefore, it is possible to maintain overall driving force and improve the running performance of the motor vehicle.

Further, according to the present invention, the ring gear is integral with a part of the case. Compared with a case where a case and a ring gear independent, the case with the ring gear does not need any fastening bolts which have been used in the related art, can reduce the number of components, be molded easily, and reduce manufacturing cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle seat type motor vehicle for use off-road comprising:
    a limited slip differential provided between right and left front wheels for distributing to the right and left front wheels, driving torques which are differentiated at a predetermined ratio when the right and left front wheels rotate at different speeds,
    wherein the limited speed differential includes a case having a ring gear, the ring gear being formed as an integral part of a left cap of the case, so that no fastening bolt is necessary, and further includes a plurality of input side blocks moving round an axis in response to the rotation of the ring gear, two output side cams sandwiching the input side blocks for the purpose of letting the input side blocks relatively slip therebetween, and being capable of independently rotating using frictional force with the input side blocks, and
    wherein the case houses the input side blocks and the output side cams.

2. The saddle seat type motor vehicle according to claim 1, wherein said two output side cams include left and right output side cams, and said input side blocks are operatively positioned between said left and right output side cams for imparting a driving force to the left and right front wheels.

3. The saddle seat type motor vehicle according to claim 1, wherein every two input side blocks are arranged in a circle wherein projections are positioned within axial grooves disposed on an inner surface of a case body.

4. The saddle seat type motor vehicle according to claim 3, wherein the axial grooves are substantially in the shape of a truncated cone and the projections are shaped substantially to conform with the axial grooves.

5. The saddle seat type motor vehicle according to claim 1, and further including a breather joint operatively positioned on an upper part of a housing cover for communicating with the atmosphere.

6. The saddle seat type motor vehicle according to claim 5, and further including a plurality of reserving ribs positioned on an inner surface of the housing cover for maintaining a predetermined quantity of fluid therebetween.

7. The saddle seat type motor vehicle according to claim 6, wherein a plurality of the reserving ribs are positioned on the inner surface of the housing cover in a forward direction of rotation for maintaining a predetermined quantity of fluid between adjacent reserving ribs.

8. The saddle seat type motor vehicle according to claim 6, wherein at least one of the reserving ribs is positioned on an inner surface of the housing cover in a backward direction of rotation for maintaining a predetermined quantity of fluid therebetween.

9. A saddle seat type motor vehicle for use off-road comprising:
    right and left front wheels operatively connected relative to the saddle seat type motor vehicle;
    a limited slip differential provided between the right and left front wheels for distributing a driving torque to the right and left front wheels;
    said driving torque being differentiated at a predetermined ratio when the right and left front wheels rotate at different speeds,
    wherein the limited speed differential includes a case having a ring gear, the ring gear being formed as an integral part of a left cap of the case, so that no fastening bolt is necessary, and further includes a plurality of input side blocks moving round an axis in response to the rotation of the ring gear, two output side cams sandwiching the input side blocks for the purpose of letting the input side blocks relatively slip therebetween, and being capable of independently rotating using frictional force with the input side blocks, and wherein the case houses the input side blocks and the output side cam.

10. The saddle seat type motor vehicle according to claim 9, wherein said two output side cams include left and right output side cams, and said input side blocks are operatively positioned between said left and right output side cams for imparting a driving force to the left and right front wheels.

11. The saddle seat type motor vehicle according to claim 9, wherein every two input side blocks are arranged in a circle wherein projections are positioned within axial grooves disposed on an inner surface of a case body.

12. The saddle seat type motor vehicle according to claim 11, wherein the axial grooves are substantially in the shape of a truncated cone and the projections are shaped substantially to conform with the axial grooves.

13. The saddle seat type motor vehicle according to claim 9, and further including a breather joint operatively positioned on an upper part of a housing cover for communicating with the atmosphere.

14. The saddle seat type motor vehicle according to claims 13, and further including a plurality of reserving ribs positioned on an inner surface of the housing cover for maintaining a predetermined quantity of fluid therebetween.

15. The saddle seat type motor vehicle according to claim 14, wherein a plurality of the reserving ribs are positioned on the inner surface of the housing cover in a forward direction of rotation for maintaining a predetermined quantity of fluid between adjacent reserving ribs.

16. The saddle seat type motor vehicle according to claim 14, wherein at least one of the reserving ribs is positioned on an inner surface of the housing cover in a backward direction of rotation for maintaining a predetermined quantity of fluid therebetween.

* * * * *